United States Patent
Bell, Jr. et al.

(10) Patent No.: US 7,568,076 B2
(45) Date of Patent: *Jul. 28, 2009

(54) VARIABLE STORE GATHER WINDOW

(75) Inventors: Robert H. Bell, Jr., Austin, TX (US);
Hugh Shen, Austin, TX (US); Jeffrey Adam Stuecheli, Austin, TX (US);
Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/836,872

(22) Filed: Aug. 10, 2007

(65) Prior Publication Data
US 2007/0277026 A1 Nov. 29, 2007

Related U.S. Application Data

(63) Continuation of application No. 10/922,272, filed on Aug. 19, 2004, now Pat. No. 7,366,851.

(51) Int. Cl.
*G06F 12/08* (2006.01)

(52) U.S. Cl. ........................ 711/154; 711/125

(58) Field of Classification Search ............... 711/154, 711/125
See application file for complete search history.

(56) References Cited

U.S. PATENT DOCUMENTS

| 5,860,107 | A | * | 1/1999 | Patel ............................ 71/140 |
| 5,870,578 | A | | 2/1999 | Mahalingaiah et al. |
| 6,859,860 | B2 | * | 2/2005 | Saito et al. .................. 711/118 |
| 6,970,996 | B1 | * | 11/2005 | Green ......................... 712/218 |
| 2002/0038407 | A1 | * | 3/2002 | Mounes-Toussi et al. ... 711/141 |
| 2003/0154353 | A1 | * | 8/2003 | Merrill et al. ............... 711/156 |

* cited by examiner

*Primary Examiner*—Tuan V Thai
*Assistant Examiner*—Yong Choe
(74) *Attorney, Agent, or Firm*—Dillon & Yudell LLP

(57) ABSTRACT

A processor includes at least one instruction execution unit that executes store instructions to obtain store operations and a store queue coupled to the instruction execution unit. The store queue includes a queue entry in which the store queue gathers multiple store operations during a store gathering window to obtain a data portion of a write transaction directed to lower level memory. In addition, the store queue includes dispatch logic that varies a size of the store gathering window to optimize store performance for different store behaviors and workloads.

7 Claims, 3 Drawing Sheets

VARIABLE STORE GATHER WINDOW

CROSS-REFERENCE TO RELATED APPLICATIONS

The present application is a continuation of U.S. patent application Ser. No. 10/922,272, filed on Aug. 19, 2004, now U.S. Pat. No. 7,366,851 entitled "Processor, Method, and Data Processing System Employing a Variable Store Gather Window". Applicants claim benefit of priority under 35 U.S.C. §120 to U.S. patent application Ser. No. 10/922,272, which is incorporated by reference herein in its entirety and for all purposes.

BACKGROUND OF THE INVENTION

1. Technical Field

The present invention relates in general to data processing and, in particular, to processors, methods and data processing systems having improved data access. Still more particularly, the present invention is related to processors, methods and data processing systems having improved store performance through implementation of a variable store gather window.

2. Description of the Related Art

Modern data processing systems typically employ multi-level volatile memory hierarchies to provide data storage. Many times, such memory hierarchies include one or more levels of low latency cache memory integrated within an integrated circuit together with one or more processor cores. The memory hierarchy may also contain one or more lower levels of external cache memory or system memory. For example, in some designs, one or more processor cores containing private level one (L1) instruction and data caches may share an on-chip L2 cache and be further supported by an off-chip L3 cache, as well as system memory (e.g., Dynamic Random Access Memory (DRAM)).

In data processing systems with on-chip caches, individual processor-issued store operations typically target only a small portion of a line of off-chip cache or system memory (e.g., 1 to 16 bytes of a 128-byte cache line). Updates to lines of lower level memory are therefore typically completed by a series of these individual store operations, which may occur sequentially.

In order to increase store performance, conventional processor chips are often equipped with a store queue containing byte-addressable storage for a line of lower level memory. Many store queues support so-called "store gathering" in which multiple store operations are collected within a particular queue entry before the line is transmitted to lower level cache or memory for storage. The gathering of multiple store operations in this manner is generally believed to advantageously reduce the number of store queue entries required to handle a given number of store operations, and to improve store performance by reducing the number of higher latency accesses to lower level memory.

The present invention recognizes that conventional implementations of store gathering do not provide uniform improvement in store performance for all workloads. For example, technical workloads with multiple streams of store operations, exemplified by benchmarks such as TRIAD, provide better performance when the time permitted for store operations to be gathered within a particular store queue entry (defined herein as a store gathering window) is relatively long. Commercial workloads, exemplified by the TPC-C benchmark, on the other hand, achieve better store performance with shorter store gathering windows. Consequently, conventional data processing systems in which the store gathering window is fixed for the life of the machine, cannot offer optimal store performance for different types of workloads.

SUMMARY OF THE INVENTION

In view of the foregoing and other shortcomings of conventional techniques of store gathering, the present invention provides improved processors, methods, and systems for store gathering that implement a variable store gathering window.

In one embodiment of the present invention, a processor includes at least one instruction execution unit that executes store instructions to obtain store operations and a store queue coupled to the instruction execution unit. The store queue includes a queue entry in which the store queue gathers multiple store operations during a store gathering window to obtain a data portion of a write transaction directed to lower level memory. In addition, the store queue includes dispatch logic that varies the size of the store gathering window to optimize store performance for different store behaviors and workloads.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
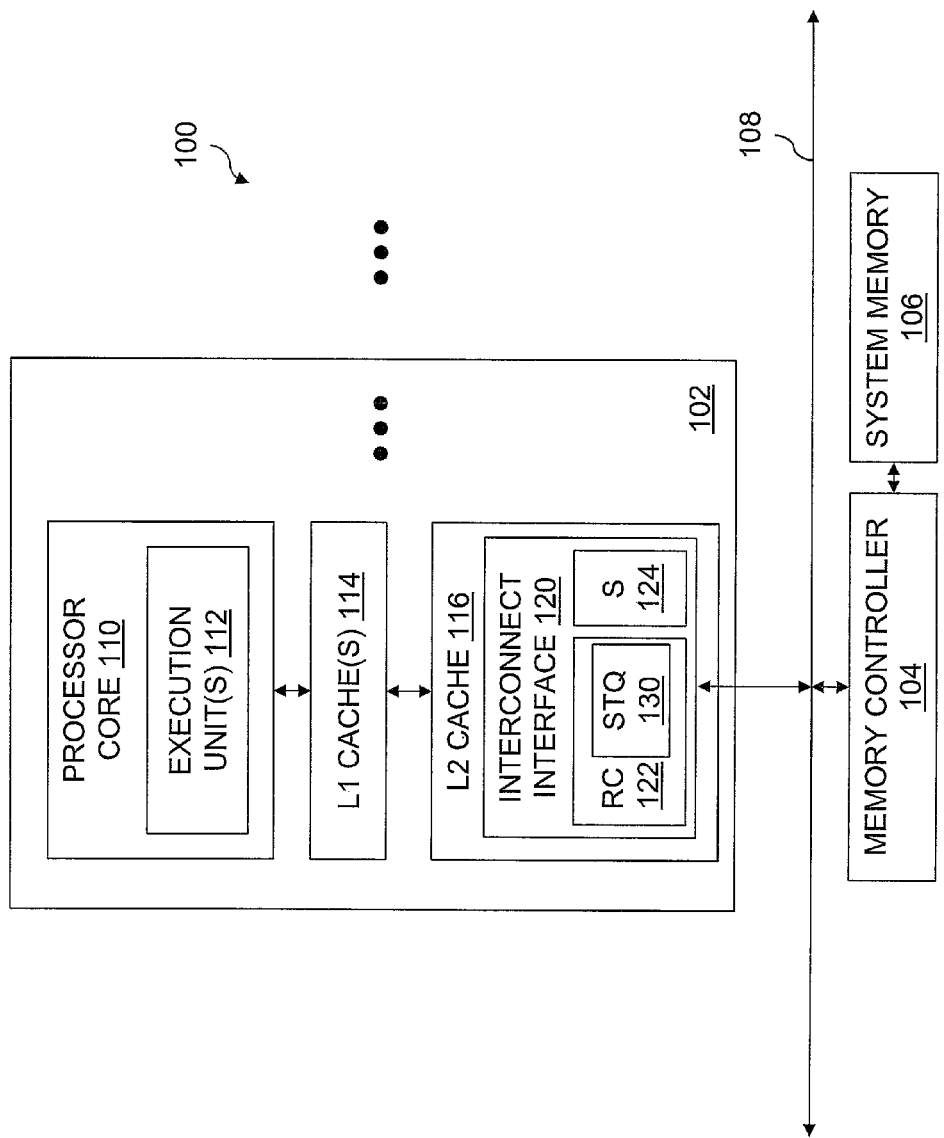
FIG. 1 is a high level block diagram of an exemplary data processing system embodying the present invention.

With reference to the figures and in particular with reference to FIG. 1, there is illustrated a high level block diagram of an illustrative embodiment of a data processing system 100 for processing instructions and data in accordance with the present invention. In particular, data processing system 100 includes an improved store queue that implements a variable store gathering window in order to enhance store performance for a variety of workloads.

As shown, data processing system 100 includes one or more processor chips 102, each comprising an integrated circuit including various execution units, registers, buffers, memories, and other functional units that are all formed by integrated circuitry. Processor chip(s) 102 are coupled to other devices, such as a memory controller 104 and a system memory 106, by an interconnect 108. As will be appreciated, data processing system 100 may include many other additional devices, such as non-volatile storage devices, input/output (I/O) devices, bridges, controllers, etc., which are not necessary for an understanding of the present invention and are accordingly not illustrated in FIG. 1.

In the depicted embodiment, processor chip 102 includes one or more processor cores 110, which each includes, among other circuitry, one or more execution units 112 for executing instructions. As is well understood by those skilled in the art, the instructions executed by execution unit(s) 112 may include a wide variety of instruction types, including LOAD instructions and STORE instructions. As defined herein, a STORE instruction is any processor-executed operation code (opcode) that, when executed, initiates a transfer of modified data into a data storage location. A STORE instruction is distinguished herein from a "store operation," which is defined as a combination of a target address and data to be stored, typically obtained through the execution of a STORE instruction.

As shown, processor core 110 is supported by a multi-level volatile memory hierarchy from which and to which processor core 110 may load and store instructions and data. In the exemplary embodiment, the volatile memory hierarchy includes an on-chip cache hierarchy including a store-through level one (L1) cache 114 (which may be bifurcated into separate instruction and data caches), a level two (L2) cache 116, and optionally one or more additional levels of on-chip or off-chip cache. The lowest level of on-chip cache (in this case, L2 cache 116) preferably includes an interconnect interface 120 that transmits and receives address, data and control transactions to and from interconnect 108. As is conventional, such transactions include WRITE transactions transmitted from interconnect interface 120 to memory controller 104 that target storage locations within system memory 106.

As further illustrated in FIG. 1, interconnect interface 120 includes a Read-Claim (RC) state machine 122 that initiates transactions (e.g., READ and WRITE transactions) on interconnect 108 and a snooper state machine (S) 124 that snoops transactions initiated by other agents (e.g., other processor chips 102) on interconnect 108. RC state machine 122 includes a store queue (STQ) 130 for staging store operations generated by processor chip 102 (usually through execution of a STORE instruction) for transmission on interconnect 108 as WRITE transactions targeting system memory 106 or some other storage location. In accordance with the present invention, STQ 130 implements an innovative technique of store gathering to reduce the number of WRITE transactions initiated on interconnect 108 utilizing a variable store gathering window.

Figure 2:
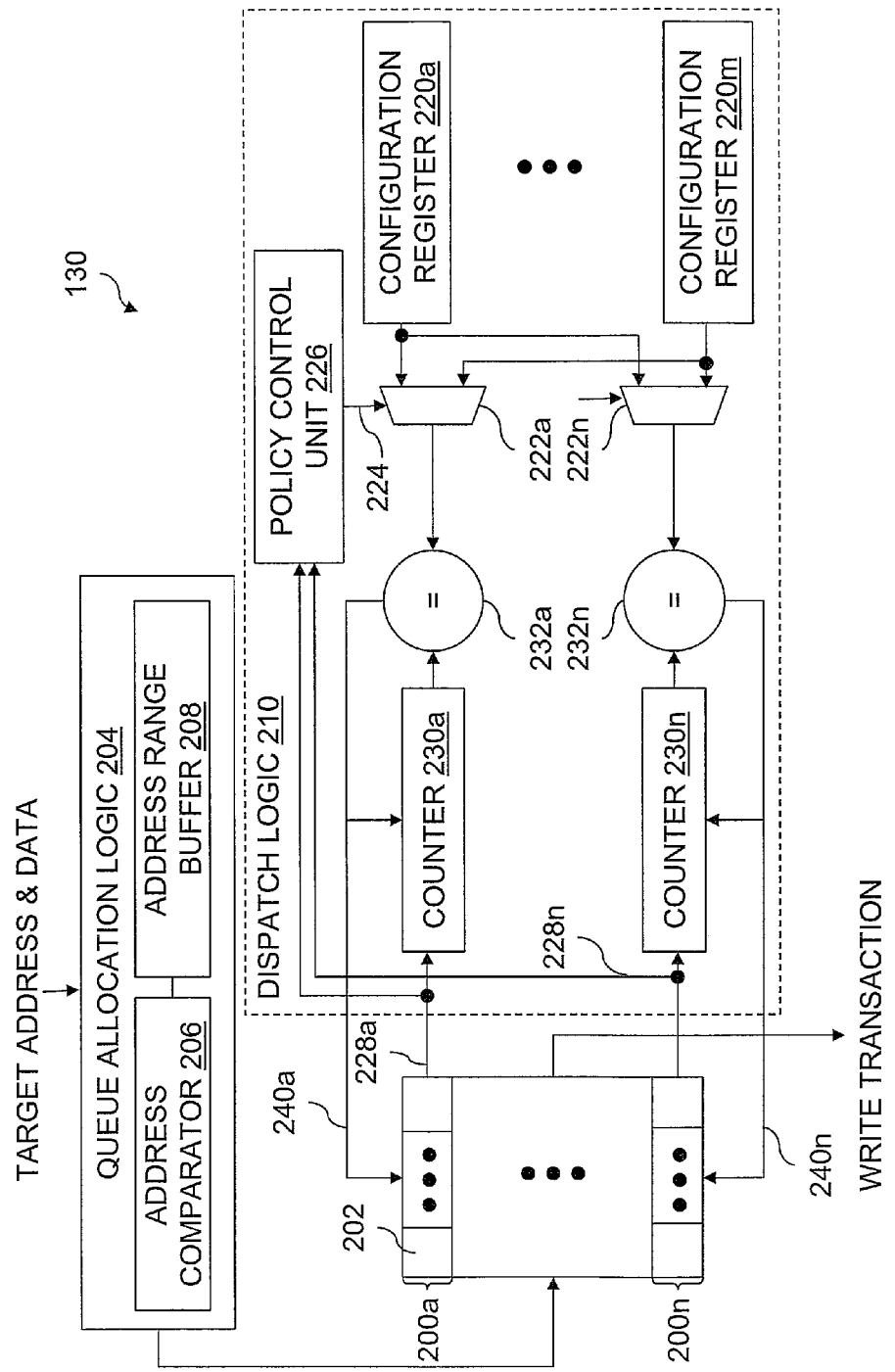
FIG. 2 more detailed block diagram of an exemplary memory subsystem in the data processing system of FIG. 1.

FIG. 2 is a more detailed block diagram of STQ 130 of FIG. 1. As depicted, STQ 130 includes one or more queue entries 200a-200n each providing buffer storage for data to be transmitted in a WRITE transaction on interconnect 108. Each queue entry 200a includes multiple buffer locations 202a-202n in which respective granules of data may be buffered in preparation for transmission in a WRITE transaction on interconnect 108. The cumulative amount of buffer storage provided by the buffer locations 202a-202n comprising a queue entry 200 is preferably (but not necessarily) equal to the line size of a lower level memory, such as system memory 106.

STQ 130 further includes queue allocation logic 204, which tracks and controls the allocation of queue entries 200a-200n. In the exemplary embodiment, queue allocation logic 204 includes an address comparator 206 and an address range buffer 208 that tracks the current real address ranges assigned to each of queue entries 200a-200n.

In operation, STQ 130 receives store operations, for example, those generated by the associated processor core 110. In response to receipt of a store operation, which includes a target address and data, address comparator 206 compares the target address of the store operation with the contents of address range buffer 208 and, in response thereto, determines whether or not the target address of the store operation falls within any of the address ranges associated with queue entries 200a-200n. If not, queue allocation logic 204 allocates a new queue entry 200 (if available) to the store operation, places the store data within the appropriate buffer location(s) 202 within the queue entry 200, and updates address range buffer 208 with the address range assigned to the newly allocated queue entry 200. If, on the other hand, address comparator 206 determines that the target address of the store operation falls within one of the address ranges currently assigned to a queue entry 200, a store gather occurs, and the data of the store operation is placed within buffer location(s) 202 in the corresponding queue entry 200 in accordance with the target address.

As further illustrated in FIG. 2, STQ 130 includes dispatch logic 210 that controls when store gathering for a particular queue entry 200 is complete and a WRITE transaction is initiated on interconnect 108. In contrast to the conventional data processing systems discussed above, which enforce a store gathering window of constant size, dispatch logic 210 advantageously supports the implementation of a variable store gathering window.

In the illustrative embodiment shown in FIG. 2, dispatch logic 210 includes a plurality of configuration registers 220a-220m for storing a plurality of different store gathering window sizes expressed, for example, in clock cycles. For example, in one embodiment, five configuration registers 220 are implemented, each configuration register 220 storing a number of cycles expressing a different power of 2 (e.g., 4, 8, 16, 32, 64). In an alternative embodiment, eight configuration registers 220 are implemented, each configuration register storing a number of cycles equal to a different multiple of 4 (e.g., 4, 8, 12, ..., 32). As will be appreciated by those skilled in the art, the contents of configuration registers 220a-220m may be established at system reset or dynamically during operation of processor chip 102. In still other embodiments, to save chip area, configuration registers 220a-220m can be replaced by hardwired values.

Configuration registers 220a-220m are each coupled to inputs of each of multiplexers 222a-222n. Each multiplexer 222 independently selects one of the possible store gathering window sizes within configuration registers 220a-220m to apply to an associated queue entry 200 in response to a respective select signal 224 generated by a policy control unit 226. Policy control unit 226 may implement any one of a number of policies (or even multiple policies) for selecting which store gathering window to apply to the store gathering performed by queue entries 200.

In one embodiment, policy control unit 226 extends the store gather window for a particular queue entry 200 if a gathered store is received in that queue entry 200 during the current store gathering window. In this embodiment, assuming that configuration registers 220a-220m contain different powers of 2 as discussed above and that policy control unit 226 previously generated a select signal 224 to select a store gather window size of 8 cycles for a particular queue entry 200, policy control unit 226 will generate a select signal 224 to extend the store gather window size to 16 cycles if a store is gathered for that queue entry 200 during the current store gathering window. Conversely, according to this exemplary policy, if no store is gathered during the current store gather window of the particular queue entry 200, or, alternatively, if a store operation is gathered in some other queue entry 200 but not the particular queue entry 200, policy control unit 226 decreases the store gather window size to the next smaller power of 2 (e.g., from 8 cycles to 4 cycles) through generation of the appropriate select signal 224.

In order to support this exemplary policy, policy control unit 226 receives gather indication 228a-228n during each cycle, where each gather indication 230 indicates if a respective one of queue entries 200a-200n gathered a store during that cycle. In addition, dispatch logic 210 includes a number of cycle counters 230a-230n, each affiliated with a respective one of queue entries 200a-200n and coupled to receive the associated one of gather indications 228a-228n. Each cycle counter 230 increments during any cycle in which the associated gather indication 228 is not asserted and resets to an initial value during any cycle in which the associated gather indication 228 is asserted. During each cycle, the value of each counter 230 is also compared by a respective one of comparators 232a-232n to the store gathering window size selected for that queue entry 200 by policy control unit 226. A comparator 232 asserts an associated one of dispatch signals 240a-240n to indicate that the store gathering window has closed in response to a determination that the count of the cycle counter 230 has reached the currently selected store gathering window size. The queue entry 200 is then eligible to dispatch a WRITE transaction on interconnect 108 when interconnect 108 is available. The assertion of a dispatch signal 240 also resets the associated cycle counter 230.

Those skilled in the art will appreciate that many other window size selection policies can be implemented by dispatch logic 210 in accordance with the present invention. Although the exemplary policy described above is applied by policy control unit 226 to all queue entries 200, it will be further appreciated that, in more complex embodiments, policy control unit 226 may implement multiple different window size selection policies, either sequentially or concurrently. If policy control unit 226 implements multiple different window size selection policies concurrently, policy control unit 226 selects a policy to apply to a particular queue entry 200 based on the workload type of the store operation, which may be indicated, for example, by the target address of a store operation or determined from monitored store patterns.

Figure 3:
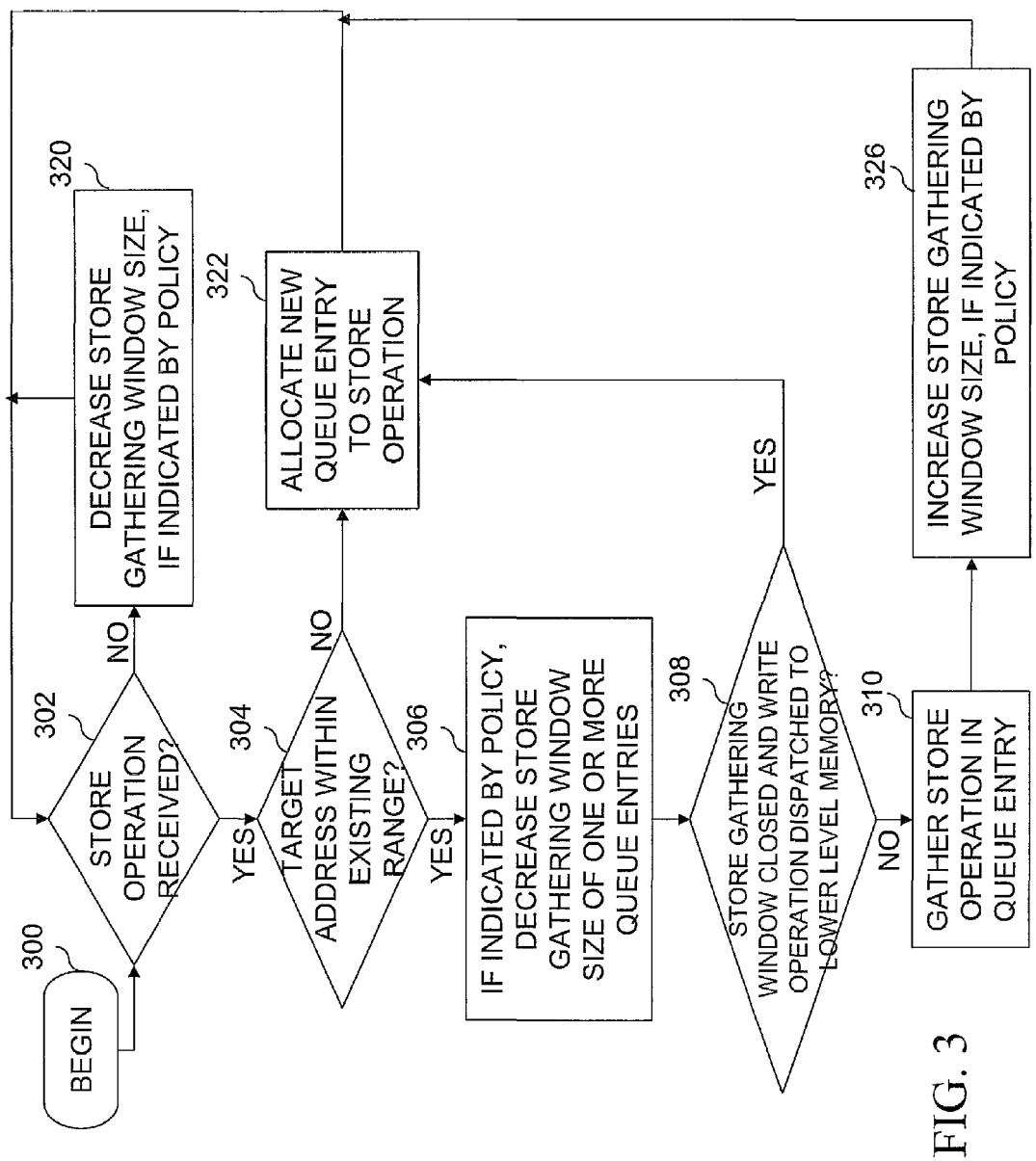
FIG. 3 is a high level logical flowchart of an exemplary process for store gathering that, in accordance with the present invention, varies a store gathering window size.

With reference now to FIG. 3, there is illustrated a high level logical flowchart of the operation of STQ 130 in accordance with one embodiment of the present invention. As shown, the process begins at block 300 and thereafter proceeds to block 302, which illustrates STQ 130 determining whether or not a store operation has been received. If not, the process passes to block 320, which illustrates policy control unit 226 of STQ 130 decreasing the store gathering window size of one or more queue entries 200, if such action is indicated by the currently implemented policy. The process thereafter returns to block 302.

If, however, a determination is made at block 302 that a store operation has been received, the process proceeds to block 304. Block 304 illustrates STQ 130 determining whether the target address of the store operation falls within the address range of an existing queue entry 200. As discussed above, this determination may be made by address comparator 206 by reference to address range buffer 208.

If a determination is made at block 304 that the target address of the store operation falls outside of the address ranges of the existing queue entries 200, a new entry is allocated to the store operation, as depicted at block 322, and policy control unit 226 sets the store gathering window size for the new entry. The process then returns to block 302. If, on the other hand, a determination is made at block 304 that the target address of the store operation falls within the address range of a particular queue entry 200, policy control unit 226 may optionally decrease the store gathering window size of one or more other queue entries 200 as shown at block 306, if such action is indicated by the currently implemented policy.

Next, as illustrated at block 308, STQ 130 makes a further determination of whether or not the store gathering window for the particular queue entry 200 is closed and whether or not the queue entry 200 has already been dispatched to lower level memory on interconnect 108. As described above, the determination of whether or not the store gathering window has closed can be made by a comparator 232 by reference to the value of a counter 230. If the store gathering window is closed and a WRITE operation has been dispatched from the particular queue entry 200 to lower level memory on interconnect 108, a new queue entry is allocated to the store operation received at block 302, as depicted at block 322. From block 322, the process returns to block 302. In some embodiments, particular store types such as SYNC operations can immediately close the store gathering window for one or more queue entries 200 regardless of the results of comparators 232.

Referring again to block 308, in response to a determination that the store gathering window of the particular queue entry 200 has not closed or that the WRITE operation has not been dispatched to lower level memory, the process proceeds to block 310. Block 310 illustrates STQ 130 gathering the data of the store operation with the data of one or more other store operations within the particular queue entry 200. As further indicated at block 326, policy control unit 226 may also increase the store gathering window size of the particular queue entry 200, if indicated by the currently implemented policy. Thereafter, the process returns to block 302, which has been described.

As has been described, the present invention provides improved processors, methods and data processing systems that enhance store performance by implementing store gathering with a variable store gathering window. By implementing a variable store gathering window, the store gathering behavior of the store queue adapts to the changing store behavior of programs over time and provides improved store performance for a variety of workloads.

While the invention has been particularly shown as described with reference to a preferred embodiment, it will be understood by those skilled in the art that various changes in form and detail may be made therein without departing from the spirit and scope of the invention.

For example, although aspects of the present invention have been described with respect to a processor and data processing system implementing the functions of the present invention, it should be understood that present invention may alternatively be embodied within a data structure or software (e.g., HDL) representation of such a processor or data processing system. Such implementations of the present invention can be embodied in a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding software or data structures that direct functions of the present invention, represent alternative embodiments of the present invention.

What is claimed is:

1. A method of operating a processor, said method comprising:
 at least one instruction execution unit executing store instructions to obtain store operations;
 in a queue entry of a store queue coupled to said instruction execution unit, gathering multiple store operations during a store gathering window to obtain a data portion of a write transaction directed to lower level memory;

selecting a store gathering window duration for said queue entry;

maintaining a count of a number of consecutive clock cycles for which a store operation is not gathered in said queue entry;

comparing the count and said store gathering window duration and responsive thereto, generating a dispatch signal to cause dispatch of a write transaction from said queue entry; and varying a duration of said store gathering window.

2. The method of claim 1, wherein said duration of the store gathering window comprises a selected number of clock cycles.

3. The method of claim 1, wherein:

said queue entry comprises a first queue entry;

said store gathering window is a first store gathering window;

said store queue includes a second queue entry; and said method further comprises applying a second store gathering window of different duration to said second queue entry.

4. The method of claim 1, wherein:

said store queue includes a plurality of queue entries including said queue entry; and said method further comprising allocating said plurality of queue entries to store operations prior to said gathering.

5. The method of claim 1, and further comprising gathering said multiple store operations at a cache memory in a cache hierarchy of the processor.

6. The method of claim 1, wherein:

said queue entry comprises a first queue entry;

said store queue includes a second queue entry; and said varying step includes decreasing a duration of the store gathering window applied to the first queue entry in response to the gathering a store operation in the second queue entry.

7. The method of claim 1, wherein said varying step comprises increasing a duration of the store gathering window applied to the queue entry in response to gathering a store operation in the queue entry.

* * * * *